(12) United States Patent
Gupta et al.

(10) Patent No.: US 8,392,472 B1
(45) Date of Patent: Mar. 5, 2013

(54) AUTO-CLASSIFICATION OF PDF FORMS BY DYNAMICALLY DEFINING A TAXONOMY AND VOCABULARY FROM PDF FORM FIELDS

(75) Inventors: Shashank Gupta, Kanpur (IN); Ramandeep Baweja, Indore (IN)

(73) Assignee: Adobe Systems Incorporated, San Jose, CA (US)

( * ) Notice: Subject to any disclaimer, the term of this patent is extended or adjusted under 35 U.S.C. 154(b) by 270 days.

(21) Appl. No.: 12/612,930

(22) Filed: Nov. 5, 2009

(51) Int. Cl.
*G06F 17/30* (2006.01)
*G06F 17/00* (2006.01)

(52) U.S. Cl. ......... 707/804; 715/200; 715/222; 715/760

(58) Field of Classification Search ................. 715/760, 715/864, 200, 222, 208, 223; 707/763, 719, 707/737, 803, 804, 805; 711/206; 358/486
See application file for complete search history.

(56) References Cited

U.S. PATENT DOCUMENTS

| | | | |
|---|---|---|---|
| 6,460,034 B1 | 10/2002 | Wical | |
| 6,578,056 B1 * | 6/2003 | Lamburt | 715/205 |
| 6,643,640 B1 * | 11/2003 | Getchius et al. | 707/719 |
| 7,003,519 B1 | 2/2006 | Biettron et al. | |
| 7,039,856 B2 * | 5/2006 | Peairs et al. | 715/200 |
| 7,110,615 B2 * | 9/2006 | Karasawa | 382/284 |
| 7,305,612 B2 * | 12/2007 | Chakraborty | 715/221 |
| 7,788,274 B1 * | 8/2010 | Ionescu | 707/763 |
| 7,913,192 B2 * | 3/2011 | Dicke et al. | 715/864 |
| 2003/0078880 A1 * | 4/2003 | Alley et al. | 705/38 |
| 2003/0167191 A1 * | 9/2003 | Slabonik et al. | 705/4 |
| 2004/0039990 A1 * | 2/2004 | Bakar et al. | 715/505 |
| 2005/0273573 A1 * | 12/2005 | Liu et al. | 711/206 |
| 2006/0195781 A1 * | 8/2006 | Jatavallabha et al. | 715/506 |
| 2009/0067013 A1 * | 3/2009 | Dixon et al. | 358/486 |
| 2010/0077320 A1 * | 3/2010 | Lepore et al. | 715/760 |
| 2010/0088317 A1 * | 4/2010 | Bone et al. | 707/737 |
| 2010/0174974 A1 * | 7/2010 | Brisebois et al. | 715/223 |

FOREIGN PATENT DOCUMENTS

| CN | 1687926 A | 10/2005 |
|---|---|---|
| JP | 2003-30221 A | 1/2003 |

OTHER PUBLICATIONS

Fung, et al., "Hierarchical Document Clustering", pp. 1-7.

\* cited by examiner

*Primary Examiner* — Cheryl Lewis
(74) *Attorney, Agent, or Firm* — Kilpatrick Townsend & Stockton LLP

(57) ABSTRACT

Embodiments herein include a content manager that constructs vocabulary from the PDF form fields to classify documents. The content manager can associate a PDF form with a markup language schema (such as an XML Schema) so that PDF form fields are semantically bounded with XML schema elements. The XML schema elements can define semantics of form fields and specify other constraints on XML elements and attributes. The content manager then associates selected form fields from the PDF form with a content folder to construct a set of properties to apply to inbound PDF form data to classify documents.

20 Claims, 8 Drawing Sheets

Available Fields

| XPath (505-1) | Form Data Type | Name | CS Data Type | Multi Value |
|---|---|---|---|---|
| ☑ /purchaseOrder/general/poNum | string | poNum | text ˅ | ☐ |
| ☐ /purchaseOrder/general/poDate | date | poDate | date ˅ | ☐ |
| ☑ /purchaseOrder/order/companyName (505-3) | string | companyName | text ˅ | ☐ |
| ☐ /purchaseOrder/order/address | string | address | text ˅ | ☐ |
| ☐ /purchaseOrder/order/city | string | city | text ˅ | ☐ |
| ☐ /purchaseOrder/order/stateProv | string | stateProv | text ˅ | ☐ |
| ☐ /purchaseOrder/order/zipCode | string | zipCode | text ˅ | ☐ |
| ☐ /purchaseOrder/order/country | string | country | text ˅ | ☐ |
| ☐ /purchaseOrder/order/phone | string | phone | text ˅ | ☐ |
| ☐ /purchaseOrder/order/fax | string | fax | text ˅ | ☐ |

AUTO-CLASSIFICATION OF PDF FORMS BY DYNAMICALLY DEFINING A TAXONOMY AND VOCABULARY FROM PDF FORM FIELDS

BACKGROUND

The present disclosure relates to content management including document classification. Document classification involves assigning a document to one or more categories based on contents of the document. Various taxonomies can be used in any conventional document classification system. Document classification can be manual or automated. Automated document classification typically operates by processing electronic documents. The electronic documents can include files originally created by a computerized device, electronic copies of paper documents scanned and processed into computer recognizable text or images, etc. Automated document classification operates by identifying keywords within a given document, and then assigning the given document to a category based on the identified keywords.

Document classification systems usually operate prior to, or in conjunction with, a search and retrieval system, or with other systems for performing further actions on the classified documents. A search and retrieval system uses one or more key words or phrases to find matching resources within a data repository. With a set of documents classified, a search query can be focused within a selected class of documents for more accurate search results and to identify documents of interest.

SUMMARY

Typically, Electronic Content Management Systems (ECMs) deploy a taxonomy (method of classifying documents) that uses static keywords (vocabulary) or a document's mime type to classify documents. For example, if a word processing document contains the keywords "attorney" and/or "judiciary," then the word processing document could be classified or labeled as "Legal." These classification tools, however, are general or broad in scope and fail to classify specific types of documents or files such as Portable Document Format (PDF) files.

PDF forms can have a wider and more dynamic range of data populated by a user. A PDF file is a fixed-layout file format created by Adobe Systems, Inc. of San Jose, Calif., U.S.A. PDF is an open standard that was officially published on Jul. 1, 2008 by the International Organization for Standardization (ISO) as ISO 32000-1:2008. A PDF file, that is a PDF form, typically contains one or more boxes or fields for collecting data in addition to data included at the time of creation of the PDF file. A rendered PDF form can sometimes include content that cannot be readily modified by a user via a graphical user interface, and can also include displayed form fields or boxes for receiving user-entered data and values via a graphical user interface. Such data and values can be stored in, and be transmitted with, the PDF file. Thus a PDF form can include content placed by a PDF creator as well as subsequently entered data entered by a PDF end user.

Techniques disclosed herein include systems and methods for a content manager to address challenges of classifying PDF files including PDF forms. The content manager can construct vocabulary (keywords) from the PDF form fields to classify documents. The content manager can associate a PDF form with a markup language schema (such as an XML Schema) so that PDF form fields are semantically bounded with XML schema elements. The content manager, or an operator via the content manager, can choose a subset of these form fields along with an XML schema binding in order to construct meta-data (set of properties) that the content manager applies to inbound PDF form data in one or more intelligent folders. Values and meta-data properties are extracted from PDF forms and populated into metadata to classify the PDF forms. Vocabulary of classification can be defined from PDF forms and it can be dynamic in nature in that the vocabulary can be changed and content will be classified according to newer or updated vocabulary.

In one embodiment, the content manager associates form fields of a Portable Document Format (PDF) file with a markup language schema. For example, a PDF file can be structured to convey data collection instructions, and include one or more fields or areas for an end user to enter or submit data. Alternatively, a form designer can create the PDF file and associate form fields with a markup language schema. This markup language schema can be, for example, an Extensible Markup Language (XML) schema. The markup language schema specifies semantic constraints on attributes of the form fields within the PDF file. These form fields can be enabled for received data, such as via a graphical user interface. Such constraints can include type of data accepted, amount of data accepted, name of form field, etc. The content manager creates a content folder representing a specific classification in that the specific classification is based on attributes of form fields from the PDF file. For example, such attributes can include name of the form field, type of data accepted, level of importance, and so forth. The content folder includes any logical grouping of data and/or rules. The content folder can be a logical extension of the content repository and/or a physical storage location.

The content manager receives a selection of a subset of the form fields from the PDF file. For example, the content manager can display a list of form fields within a given PDF file, and enable a user to select a portion of the presented form fields. The content manager then associates the selection of the subset of the form fields with the content folder including creating metadata describing the selected form fields. The content folder is configured for storing corresponding individual data entries received within the selected form fields of PDF files. Individual data entries are typically received after creation of the PDF form. The content manager extracts data from form fields of submitted PDF files. The submitted PDF files have data input into form fields associated with the content folder. Typically, the submitted files are PDF forms completed by several end users. The data can be input, for example, via the graphical user interface, such as when presented to an end user. The extracted data and metadata describing the form fields can be stored separately from the submitted PDF files. In other words, a repository or collection of completed PDF forms can be stored in a separate location from the content folder as the content folder stores metadata and extracted values without storing complete PDF files. The content manager then automatically classifies the submitted PDF files based on attributes of the selected form fields and the extracted data. By storing data separately from the submitted PDF files, the content manager can associate form fields from multiple PDF files with a given content folder.

In another embodiment, after classifying PDF files, the content manager can then perform various actions on the classified PDF files. The content manager can apply a rule to data stored within the content folder in that the rule identifies corresponding submitted PDF files satisfying the rule. By way of a non-limiting example, in applications where the PDF forms include purchase order forms, the content manager can perform actions based on the form fields and corresponding data. Continuing with this example, the content manager can transmit specific PDF forms that have a purchase order value less then $10,000 to a junior executive, and transmit specific PDF forms that have a purchase order value greater than $10,000 to a senior executive. The content manager can also search forms on the basis of the fields as well as searching for all the forms having a subtotal within a specific range, such as between $3000 and $5000. In addition to the various actions that the content manager can perform on classified PDF files, PDF files can also be automatically classified based on rules applied to data stored within the content folder.

In another embodiment, the content manager can dynamically update the document classification based on modification to form fields. In response to modifying attributes of one or more form fields of the PDF file, the content manager updates the metadata and data stored in the content folder to update the specific classification. This can include reprocessing previously collected PDF files stored in a content repository as well as subsequently received PDF files.

In addition to the example method, product, system, etc., embodiments as discussed above, and other embodiments herein, can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a content manager and/or related functions as explained herein to carry out different embodiments as described herein.

Yet other embodiments herein include software programs to perform the steps and operations summarized above and disclosed in detail below. One such embodiment comprises a computer program product that has a computer-storage medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: generating a Portable Document Format (PDF) file having form fields for receiving data via a graphical user interface; associating the form fields with a markup language schema, the markup language schema specifying semantic constraints on attributes of the form fields within the PDF file; creating a content folder representing a specific classification, the specific classification based on attributes of form fields from the PDF file; receiving a selection of a subset of the form fields from the PDF file; associating the selection of the subset of the form fields with the content folder, the content folder configured for storing metadata of the selected form fields and corresponding individual data entries received within the selected form fields of PDF files; extracting data from form fields of submitted PDF files, the submitted PDF files having data input into form fields associated with the content folder, the data being input via the graphical user interface, the extracted data and metadata of the form fields stored separately from the submitted PDF files; and automatically classifying the submitted PDF files based on attributes of the selected form fields and the extracted data. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting electronic content management and document classification. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 7 is a screen shot of an example content manager showing form field selections according to embodiments herein.

DETAILED DESCRIPTION

Figure 1:
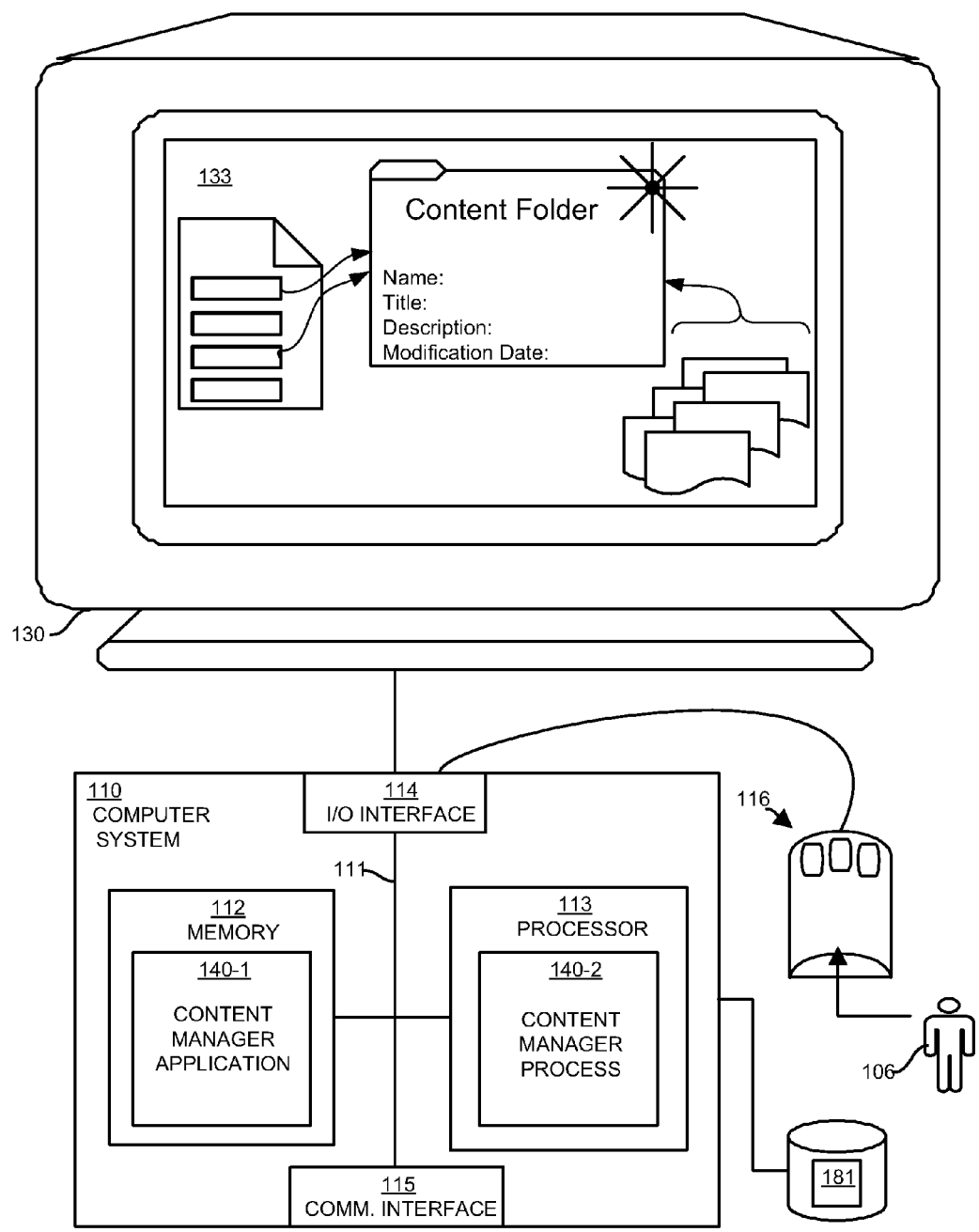
FIG. 1 is an example block diagram of a content manager operating in a computer/network environment according to embodiments herein.

According to one example embodiment, a content manager constructs vocabulary (keywords) from the PDF form fields to classify documents. In other words, the content manager generates a taxonomy using the form fields as vocabulary to construct a classification. The content manager can associate a PDF form with a markup language schema (such as an XML Schema) so that PDF form fields are semantically bounded with XML schema elements. Alternatively, a form designer can create a PDF file and associate form fields with a markup language schema. The XML schema elements can define semantics of form fields and specify other constraints on XML elements and attributes. The XML schema can define transformations to apply to form field contents and metadata of the field.

The content manager, or an operator via the content manager, can choose a subset of these form fields along with an XML schema binding in order to construct meta-data (set of properties) that the content manager applies to all inbound PDF form data in one or more intelligent folders. Values and meta-data properties are extracted from PDF forms and populated into metadata to classify the PDF forms. Vocabulary of classification can be defined from PDF forms and it can be dynamic in nature in that the vocabulary can be changed and content will be classified and reclassified according to newer or updated vocabulary.

The content manager generates a Portable Document Format (PDF) file having form fields for receiving data via a graphical user interface. For example, a PDF file can be structured to convey data collection instruction, and include one or more fields or areas for an end user to enter data. The content manager associates the form fields with a markup language schema. This markup language schema can be, for example, an Extensible Markup Language (XML) schema. The markup language schema specifies semantic constraints on attributes of the form fields within the PDF file. Such constraints can include type of data accepted, amount of data accepted, name of form field, etc. The content manager creates a content folder representing a specific classification in that the specific classification is based on attributes of form fields from the PDF file. For example, such attributes can include name of the form field, type of data accepted, level of importance, and so forth.

The content folder includes any logical grouping of data and/or rules. The content folder can be a logical extension of the content repository and not necessarily a physical storage location. In some embodiments the content manager can create content folders as an individual entity in a file system that can be copied, moved or deleted independent of the content manager. In other embodiments, a content repository or storage location or database can store data for multiple content folders with each content folder being a logical grouping of data or a logical extension of that storage location.

The content manager can divide content folders in subfolders, which can also be defined as spaces or subspaces, to manage, for example, various projects. Content folders can be used to store and organize and associate content items and other content folders. A content folder can store or reference any type of content. A content folder and its contents can be moved or copied from one location to another. Each content folder can optionally include a primary owner or administrator for making changes to the content folder or its immediate contents. A content folder can optionally have content rules defined for how the content that enters, exits, or currently resides in a content folder is managed. A content folder can also have rules applied for automatic content actions such as applying right policies to stored content or sending notifications. The content manager can enable sharing content folders among several users for collaboration. Content folders can also support various plug-ins from separate processes.

The content manager can include a content repository for storing meta data and values, and a document repository for storing submitted documents. The content manager can create intelligent folders in the content repository, which will attach or extract metadata from or to inbound PDF forms. Thus, when an end user completes a form and submits the form, the PDF form is then parsed and the data in different fields is extracted and saved in metadata of the content.

Auto-classification of the PDF forms is one use of content manager that operates by defining rules on the intelligent folders, which operate on a given PDF Form's metadata to classify the PDF forms. Complex conditions on the metadata can also be defined on the intelligent folders. By way of a non-limiting example, an administrator can define a rule that any form initiated by a customer whose name is "John" should be classified as a "Premium Customer." In another example, any field that has "Total Value" greater than $10,000 should be classified as "High Value Order" and labeled with "Immediate Action Required." Apart from classification, other actions can also be defined such as assigning a task to different users based on the Total Value of a given PDF Form. For example, if the total value is less than $10,000, than the content manager can send the corresponding PDF form directly for processing, but if the value is more than $10,000 than the content manager can send the corresponding form for approval from higher authority before processing the form so that a task to a corresponding person responsible can be assigned for approval.

Now more particularly, FIG. 1 shows a general overview of the content manager and how it can be tied to an example physical apparatus, such as a computer and related components. After this description of FIG. 1 appears a more detailed description of processes and methods executed by the content manager itself. This subsequent description will explain the flow charts and reference screen shots in the drawings to describe example embodiments.

In FIG. 1, computer system 110 is shown connected to display monitor 130 for displaying a graphical user interface 133 for a user 106 to use a content manager 140 for classifying documents, using input devices 116, including classifying PDF forms containing data populated within form fields of the PDF forms. Repository 181 can optionally be used for storing content folders, submitted PDF forms, and other data both before and after processing. Input devices 116 can include one or more devices such as a keyboard, computer mouse, etc.

Note that the following discussion provides a basic embodiment indicating how to carry out functionality associated with the content manager 140 as discussed above and below. It should be noted, however, that the actual configuration for carrying out the content manager 140 can vary depending on a respective application. For example, as previously discussed, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, 110 interface 114, and a communications interface 115.

I/O interface 114 provides connectivity to peripheral devices such as input devices 116 including a computer mouse, a keyboard, a selection tool to move a cursor, display screen, etc.

Communications interface 115 enables the content manager 140 of computer system 110 to communicate over a network and, if necessary, retrieve any data required to create views, process content, communicate with a user, etc. according to embodiments herein.

As shown, memory system 112 is encoded with content manager 140-1 that supports functionality as discussed above and as discussed further below. Content manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the content manager 140-1. Execution of the content manager 140-1 produces processing functionality in content manager process 140-2. In other words, the content manager process 140-2 represents one or more portions of the content manager 140 performing within or upon the processor 113 in the computer system 110.

It should be noted that, in addition to the content manager process 140-2 that carries out method operations as discussed herein, other embodiments herein include the content manager 140-1 itself (i.e., the un-executed or non-performing logic instructions and/or data). The content manager 140-1 may be stored on a tangible computer readable storage medium including computer readable storage media such as floppy disk, hard disk, optical medium, etc. According to other embodiments, the content manager 140-1 can also be stored in a memory type system such as in firmware, read only memory (ROM), or, as in this example, as executable code within the memory system 1012.

In addition to these embodiments, it should also be noted that other embodiments herein include the execution of the content manager 140-1 in processor 113 as the content manager process 140-2. Thus, those skilled in the art will understand that the computer system 110 can include other processes and/or software and hardware components, such as an operating system that controls allocation and use of hardware resources, or multiple processors.

Functionality supported by computer system 110 and, more particularly, functionality associated with content manager 140 will now be discussed via flowcharts and screen shots in FIG. 2 through FIG. 8. For purposes of the following discussion, the content manager 140 or other appropriate entity performs steps in the flowcharts.

Figure 2:
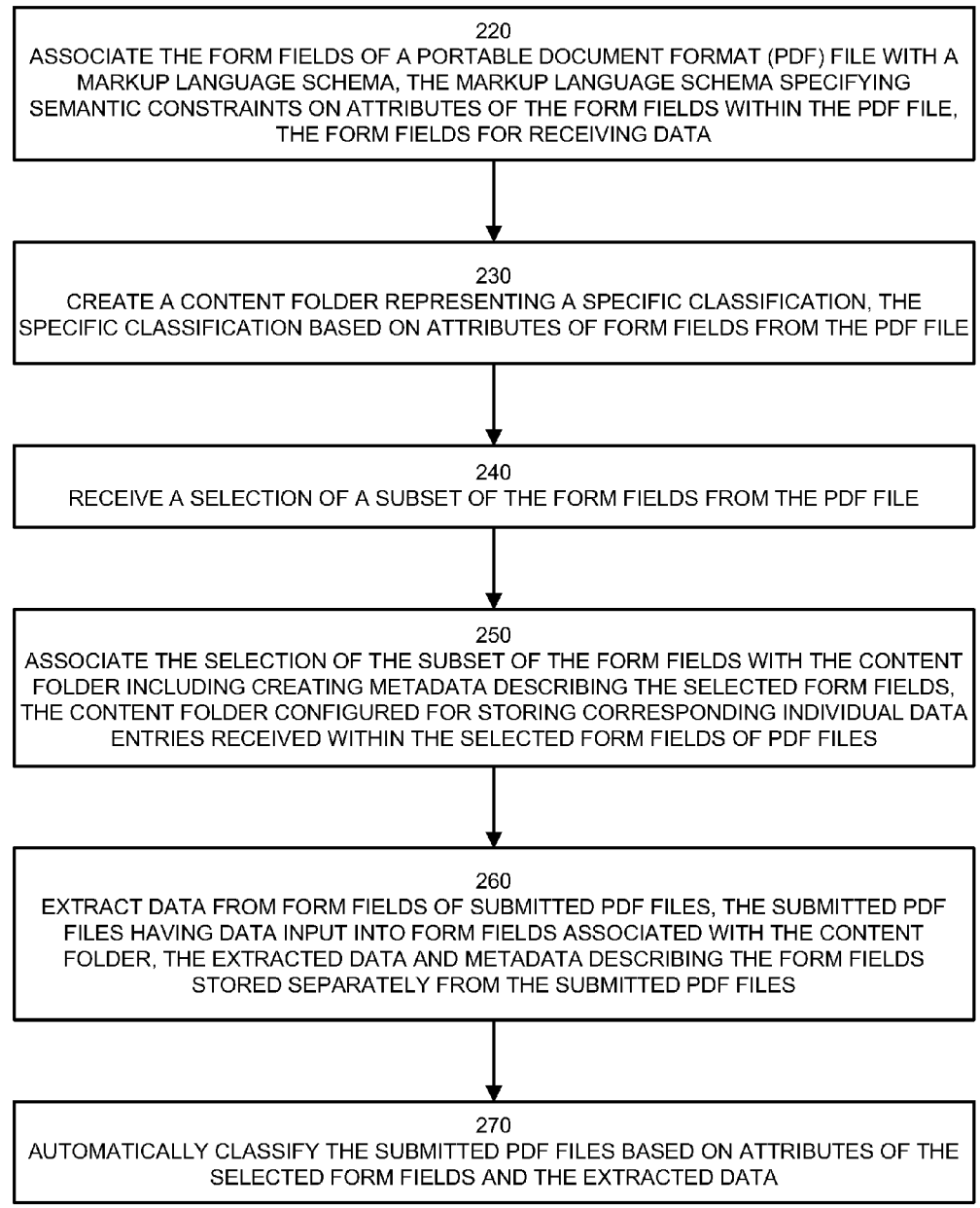
FIG. 2 is a flowchart illustrating an example of a process supporting a content manager according to embodiments herein.

Now describing embodiments more specifically, FIG. 2 is a flow chart illustrating embodiments disclosed herein.

In step 220, content manager 140, or a PDF form designer, associates the form fields 505 of a Portable Document Format (PDF) file with a markup language schema. The PDF specification defines functionality for the fixed layout PDF files to include fields, check boxes, radio buttons, drop down boxes, or other data entry devices to receive input and store actions and entered data as part of the PDF file. The markup language schema specifies semantic constraints on attributes of the form fields within the PDF file. The form fields being structured for receiving data. Thus the created PDF file contains an embedded markup language schema. The schema defines what kind of form fields that a given form can contain, and gives semantics of each field. Associating the form fields 505 with the PDF file can occur as part of the PDF file creation process, or after creation of the PDF file as a modification to the PDF file. Associating form fields 505 with the PDF files creates a taxonomy based on each field and values of properties defined in the taxonomy, which in turn can be defined based on data that an end user inputs.

Figure 5:
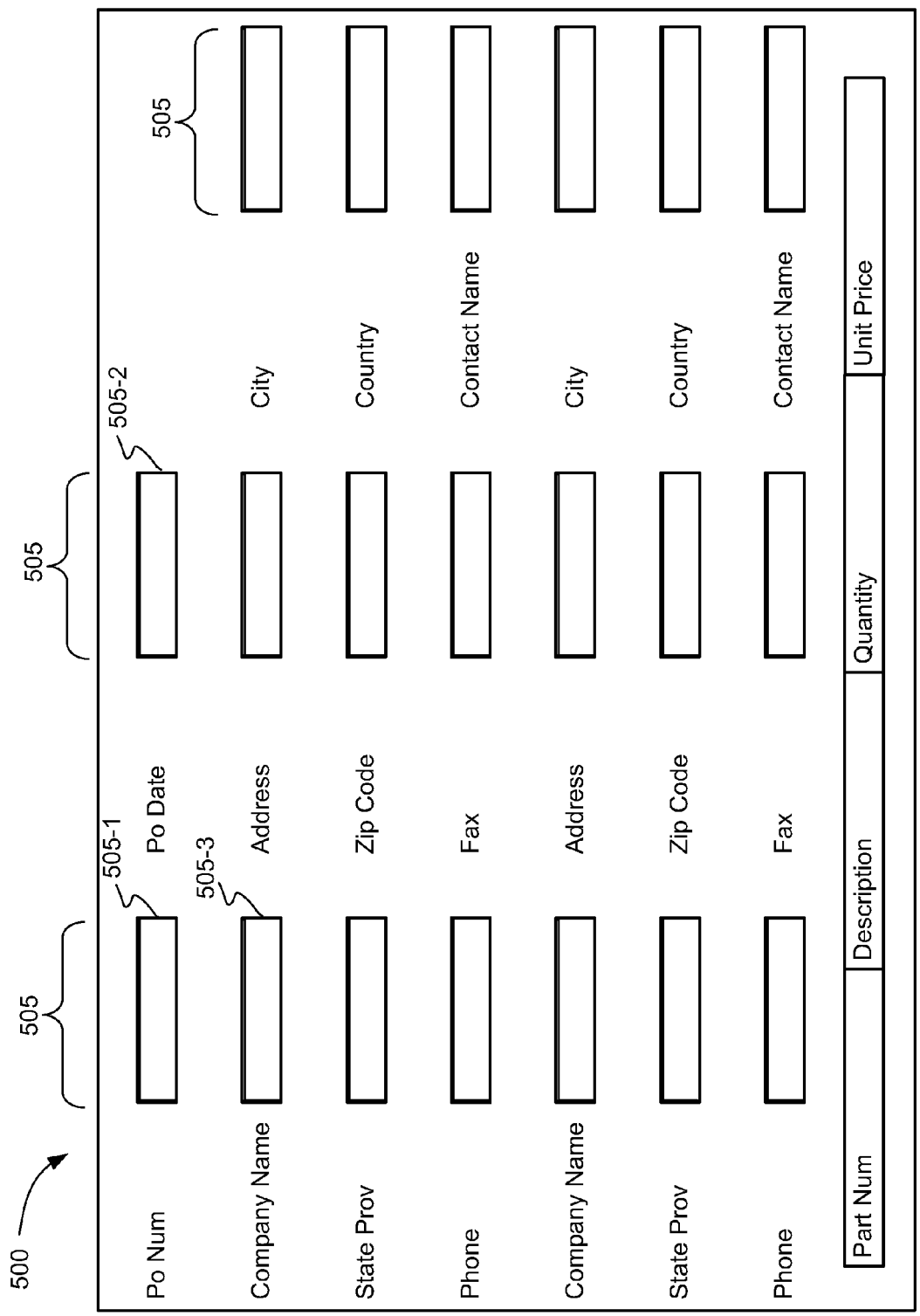
FIG. 5 is a screen shot of an example content manager showing an example PDF form according to embodiments herein.

FIG. 5 illustrates a section of an example PDF form 500. PDF form 500 includes numerous form fields 505 for receiving data. For example, form field 505-1 allows a user to enter a purchase order number. Form field 505-2 allows a user to enter a purchase order date. Form field 505-3 allows a user to enter a company name. This example PDF form 500 includes form fields relating to an invoice. Note that PDF form 500 is not restricted to invoicing, but can relate to any subject matter such as employee information, research surveys, government filings, applications, etc.

In step 230, content manager 140 creates a content folder representing a specific classification, with this specific classification based on attributes of form fields 505 from the PDF file. The content folder is an intelligent folder or space within or accessible to a content repository. Content folders can contain metadata and properties of form fields 505 and any data submitted within those form fields.

Figure 6:
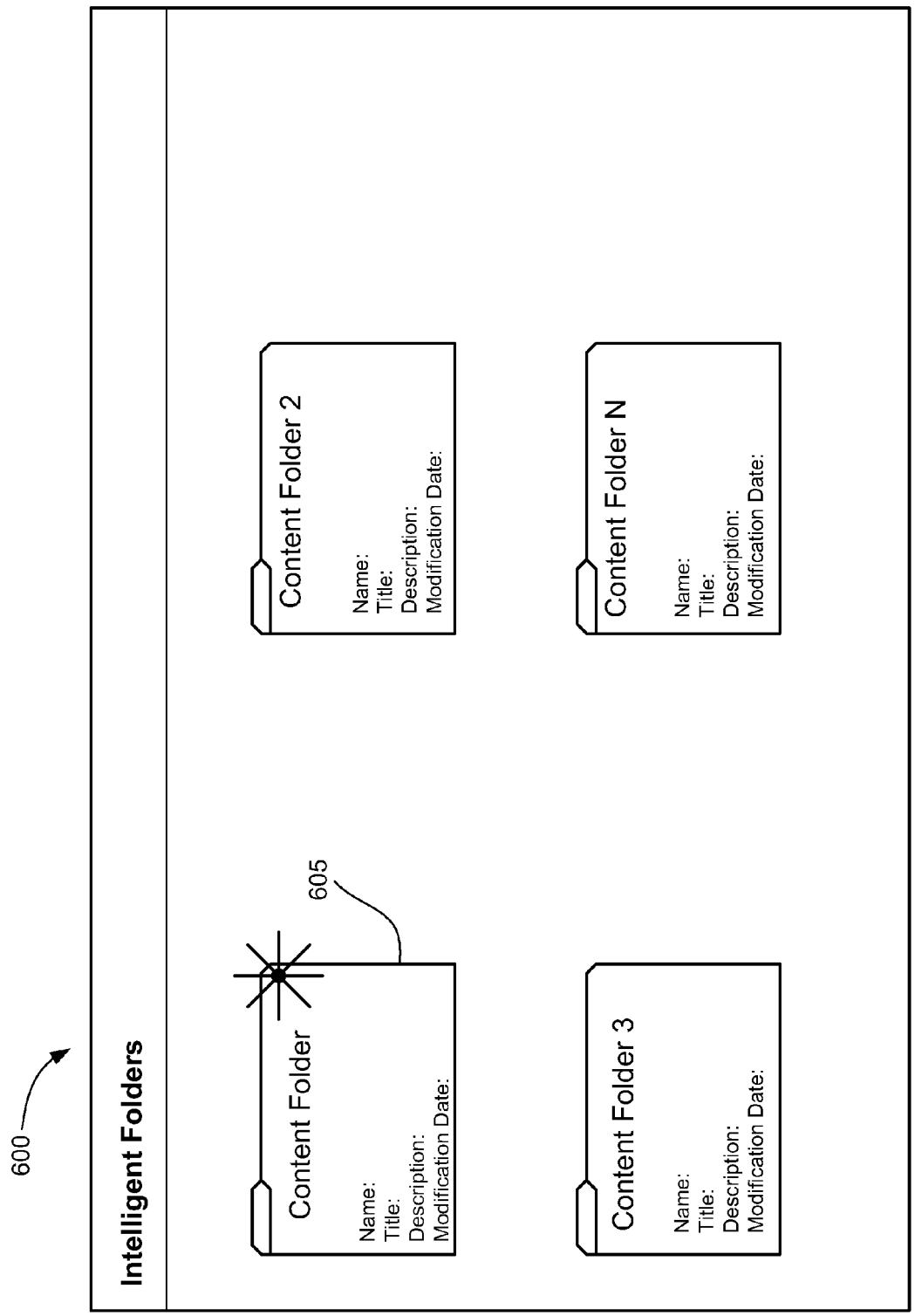
FIG. 6 is a screen shot of an example content manager showing content folders according to embodiments herein.

FIG. 6 illustrates an example screen shot of various content folders that can be selected, including newly created content folder 605. Each displayed content folder can be identified by name, title, description, creation date, modification date, creator, modifier, namespace, and other properties. Content manager 140 can also display a detailed view of each content folder 605 to identify associated links, organization, processes, categories, rules, and so forth.

In step 240, content manager 140 receives a selection of a subset of the form fields 505 from the PDF file. While all form fields within a given PDF file can be associated with a content folder, content manager 140 includes the ability to associate a portion or subset of those form fields without associating all form fields with the content folder. Prior to receiving a selection of individual form fields within a given PDF form, content manager 140 can present a list of PDF forms or form designs from which an administrator can select to access individual form fields. In addition to PDF forms, content manager 140 can display XML Data packages (XDP) and XML forms. Form design refers to an XML Forms Architecture (XFA) form created by a form designer.

Once a PDF form or form design is selected, the content manager 140 parses the schema and analyzes information of the leaf nodes (name, type, multi-valued). The content manager 140 then displays an Xpath (XML Path Language), XSD (XML Schema) data type, etc., for review and selection. An administrator can select a name of a property (last node name by default) to a corresponding Xpath of the leaf element/attribute.

FIG. 7 illustrates an example form field list 700 showing multiple available form fields for selection. In this example figure, an administrator selects the purchase order number field 505-1 and the company name field 505-3. In this example, the administrator has selected two fields. In other embodiments, the administrator can select any number of the available fields. With fields 505-1 and 505-3 selected, these fields will be used in the content folder, or intelligent space, as part of the taxonomy.

In step 250, content manager 140 associates the selection of the subset of the form fields with the content folder including creating metadata describing the selected form fields. In this step, content manager 140 creates metadata from the form fields. The metadata can include a name of a form field as well as user-entered data. The content folder is configured for storing corresponding individual data entries received within the selected form fields of PDF files. In other words, some properties of this content folder have been configured so that whenever documents or completed PDF forms are processed, the metadata and populated data can be stored in the content folder.

Step 250 thus establishes document classification based on selected form fields and associated set of properties such as the embedded XML schema elements. These properties can includes items such as name, title, description, etc, or other metadata defining data to be received via the form fields. Such properties may or may not be visible via a graphical user interface or by automated optical character recognition. All of this data can be stored in a central content repository accessible by one or more content folders. In executing or creating the association, content manager 140 stores the XPath in the title of a given property. Selected fields, unselected fields, form design path, etc. can be stored in meta data of the content folder, and can be viewed in a node browser.

In step 260, content manager 140 extracts data from form fields of submitted PDF files. The submitted PDF files have data input into form fields associated with the content folder. The extracted data and metadata describing the form fields is stored separately from the submitted PDF files, and can be extracted for any type of processing outside of the PDF form.

The submitted PDF files refer to PDF forms in which an end user has entered and stored data within form fields. Submitted PDF files may have all or only a portion of fields populated with text. In other words, after a PDF file is created with an XML schema and associated with a content folder, the PDF file (or copies of the PDF file) can be transmitted to or accessed by any number or PDF form users from any number of locations. For example, a given PDF form might relate to a mortgage application downloadable from a lender. A mortgage applicant can complete the form by entering data in form fields 505, and then transmit the form to the lender. Content manager 140 can then extract data from submitted PDF forms as the PDF forms are received, or extract data in batches.

In step 270, content manager 140 automatically classifies the submitted PDF files based on attributes of the selected form fields and the extracted data. Whenever a data-filled PDF or a data-filled XML document is stored in the document repository, content manager 140 automatically routes each document based on the values within each document or PDF form.

Figure 3:
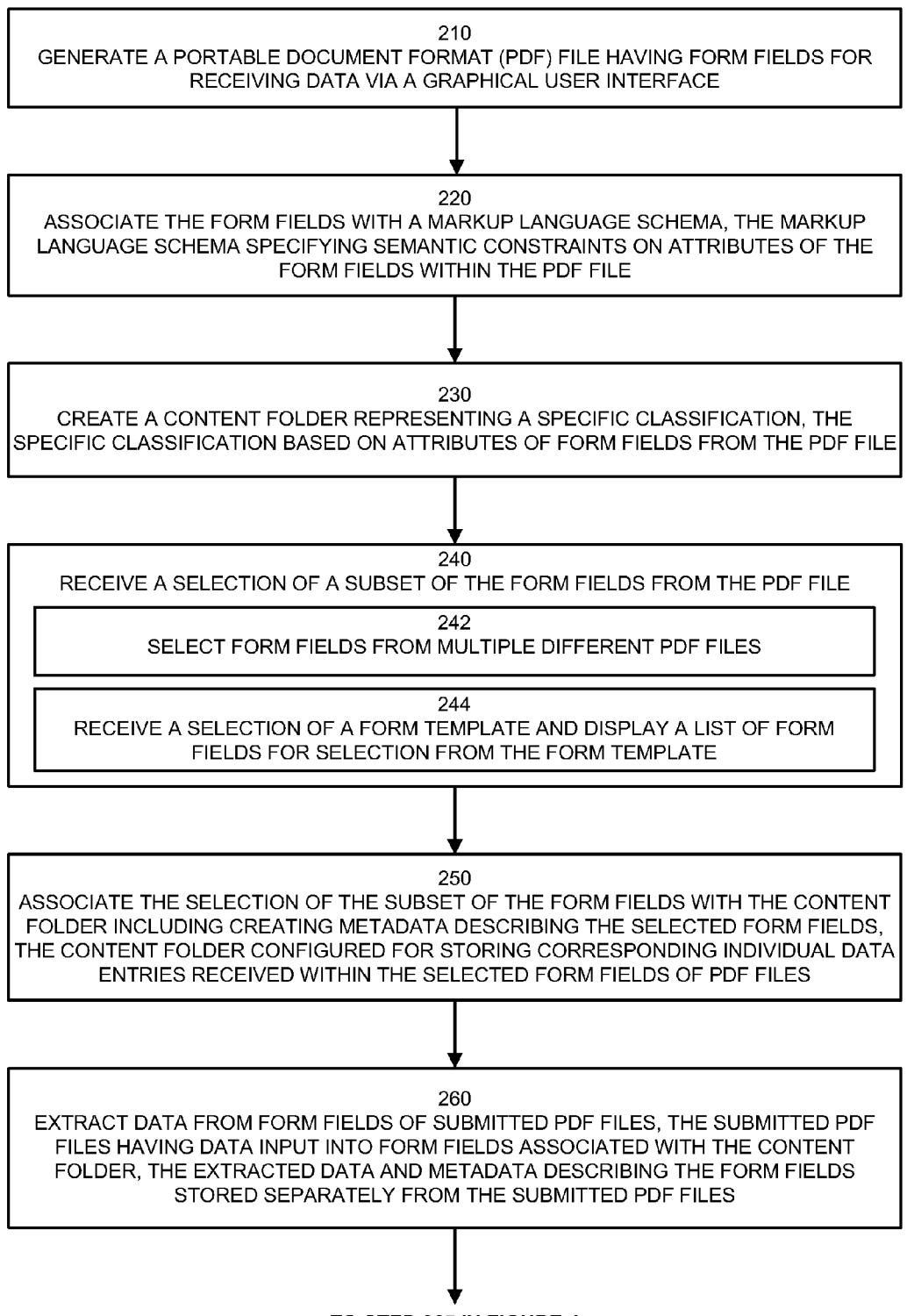
FIGS. 3-4 is a flowchart illustrating an example of a process supporting a content manager according to embodiments herein.
Figure 4:
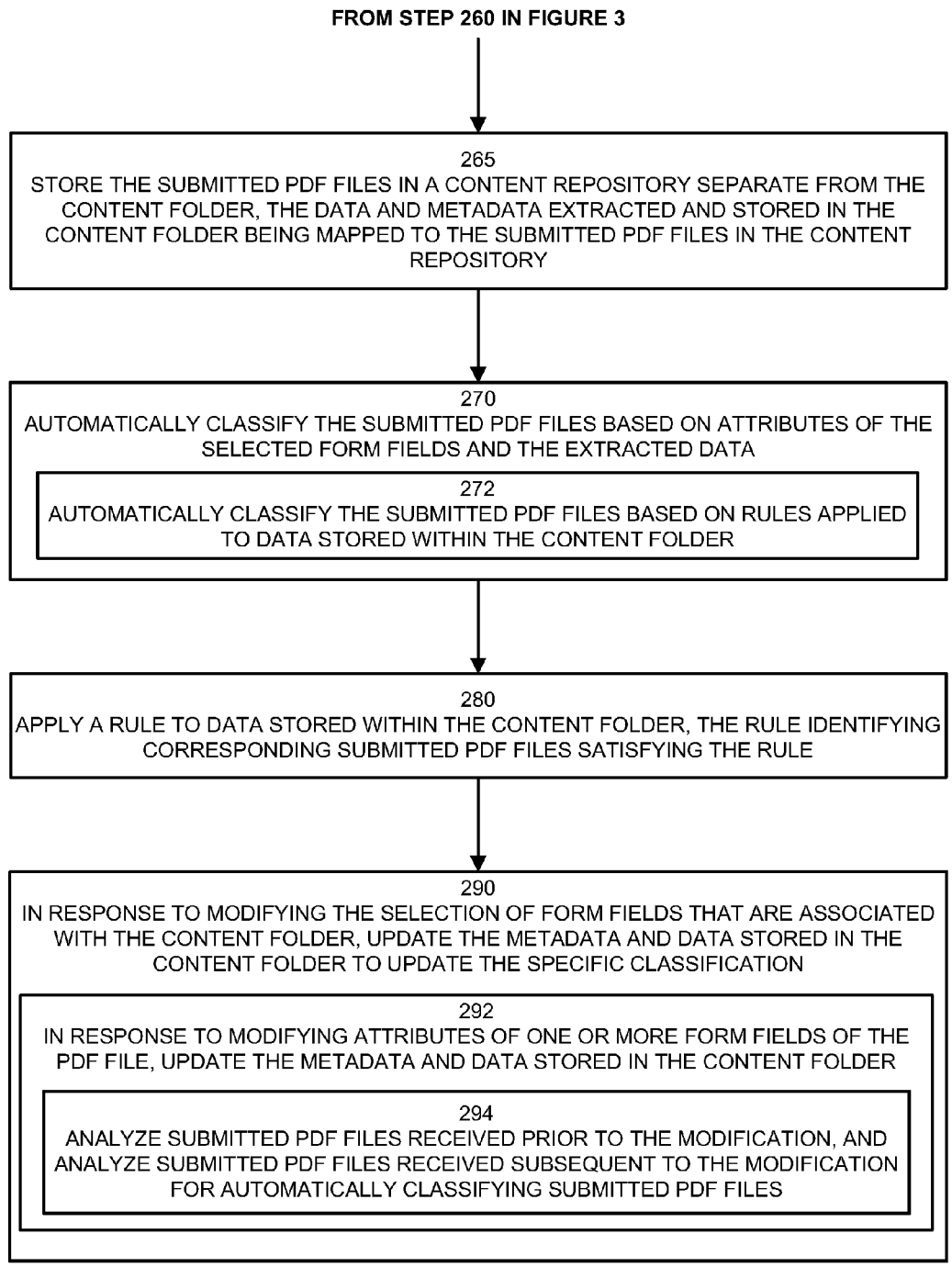

FIGS. 3 and 4 illustrate a flow chart of another embodiment in which content manager 140 expands on several of the process steps described in FIG. 2.

In step 210, content manager 140 generates a portable document format (PDF) file having form fields for receiving data via a graphical user interface. Note that such a PDF file can alternatively be created by the content manager, a form designer, or another application including an application separate from or external to the content manager. The PDF specification defines functionality for the fixed layout PDF files to include fields, check boxes, radio buttons, drop down boxes, or other data entry devices to receive input and store actions and entered data as part of the PDF file.

In step 220, content manager 140 associates the form fields 505 with a markup language schema. The markup language schema specifies semantic constraints on attributes of the form fields within the PDF file.

In step 230, content manager 140 creates a content folder representing a specific classification, with this specific classification based on attributes of form fields 505 from the PDF file. For example, the specific classification can include attributes of form fields from the PDF file specifying field names of form fields.

In step 240, content manager 140 receives a selection of a subset of the form fields 505 from the PDF file.

In step 242, content manager 140 receives a selection of a subset of the form fields includes selecting form fields from multiple different PDF files. Content manager 140 provides the ability to associate metadata from multiple different PDF forms. For example, a PDF creator might create variations on order forms, invoice forms, mortgage forms, etc. More specifically, and by way of a non-limiting example, a given mortgage lender might have different mortgage forms for commercial and residential mortgages. At the same time, the lender might want to classify both types of mortgage applications in a same content folder.

In step 244, content manager 140 receives a selection of a form template and displays a list of form fields for selection from the form template. When selecting PDF forms to access form fields available for selection, content manager 140 can present individual PDF forms for selecting form fields one at a time, or content manager 140 can simultaneously display form fields from several different PDF forms based on some criteria or grouping condition.

In step 250, content manager 140 associates the selection of the subset of the form fields with the content folder.

In step 260, content manager 140 extracts data from form fields of submitted PDF files. The submitted PDF files have data input into form fields associated with the content folder, with the data being input via the graphical user interface. The extracted data and metadata of the form fields is stored separately from the submitted PDF files.

In step 265, content manager 140 stores the submitted PDF files in a content repository separate from the content folder. The data and metadata extracted and stored in the content folder are mapped to the submitted PDF files in the content repository.

The mapping can be based on a namespace associated with the XML Schema. In other words, extracted data from PDF forms can be stored separately from the PDF forms themselves.

In step 270, content manager 140 automatically classifies the submitted PDF files based on attributes of the selected form fields and the extracted data.

In step 272, content manager 140 automatically classifies the submitted PDF files based on rules applied to data stored within the content folder. In addition to document classification based on form fields and XML schema elements, content manager 140 can also classify PDF forms based on rules that operate on submitted data, that is, data populated within form fields.

Figure 8:
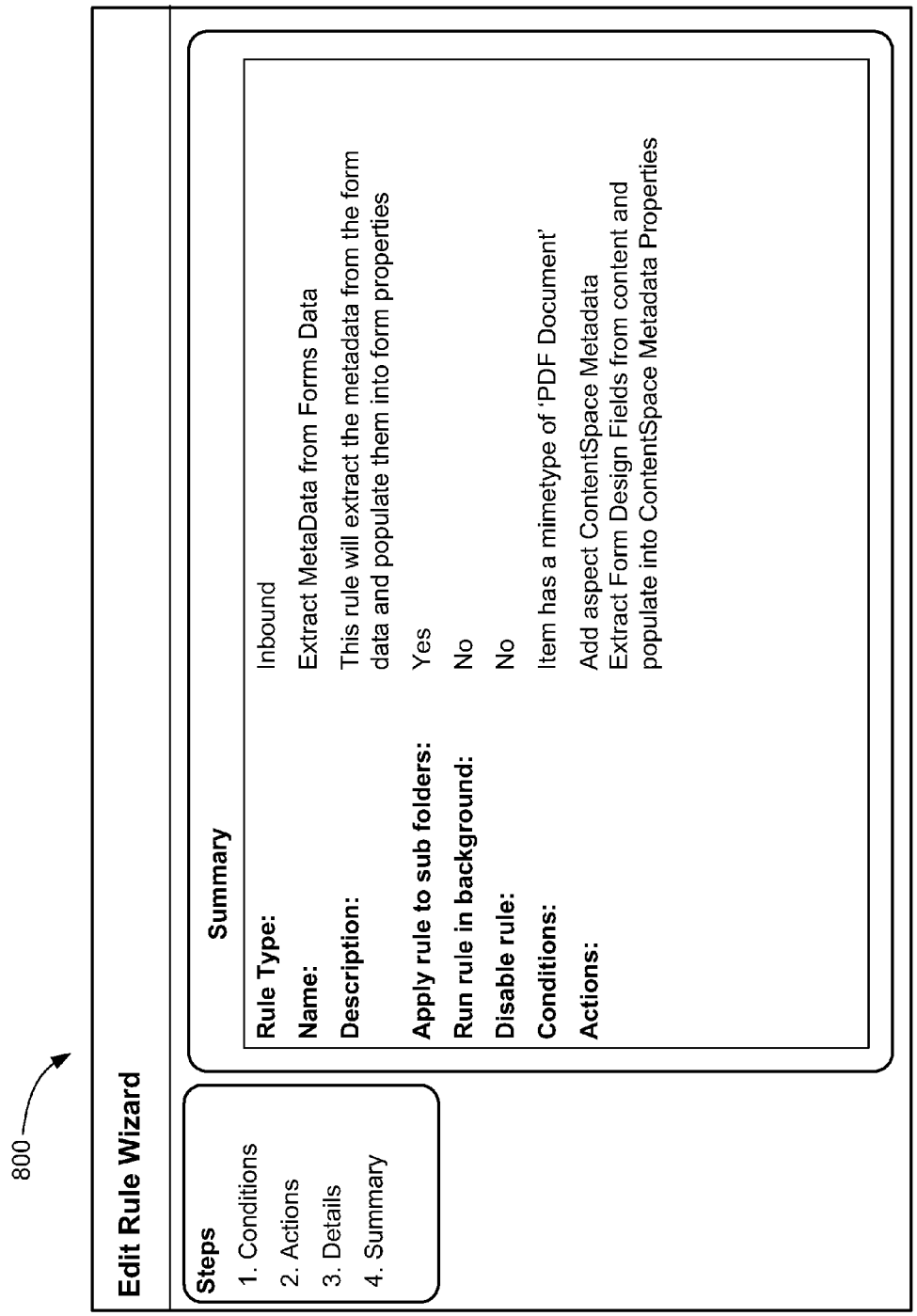
FIG. 8 is a screen shot of an example content manager showing document rule configuration according to embodiments herein.

FIG. 8 illustrates a screen shot of an example rule wizard 800 for establishing conditions and actions for rules that operate on data within the content folder. In the rule wizard 800, a user can view rule settings and edit rules. Establishing rules, or filters, includes setting conditions, such as when an item has a specific mime type (such as PDF Document), when an item contains a specific value in its name, when an item has a specific date value in a property, etc. Conditions can include associated values.

Rules can include actions to perform or refrain from performing. Such actions can include extracting metadata from newly created forms, extracting data from submitted forms, transmitting notifications, creating copies of identified PDF forms, etc. Actions and conditions can include any number of options, such as whether to apply the rule to sub folders or to run the rule in the background. An administrator can define rule processing based on specific requirements, or can access available rules using a pulldown menu. Rules can be field specific, Content manager 140 can execute rules on inbound and/or modified XML/PDF documents inside content folders and content subfolders. Actions can extract a property value using Xpath, or another query language, and then populate metadata with extracted values. Actions can apply aspects to a given document. Administrators can view values of these properties via a node browser. Content manager 140 can automatically re-invoke a rule when content or metadata is changed so that content and metadata are consistent.

In addition to rules, a user can perform a metadata search on a content folder document classification to retrieve target documents. Content manager 140 enables range-based searches or searches on custom attributes.

In step 280, content manager 140 applies a rule to data stored within the content folder. This rule identifies corresponding submitted PDF files that satisfy the rule. For example, a rule condition might identify purchase orders over $10,000, and then initiate an action such as transmitting corresponding PDF forms to predetermined recipients.

In step 290, content manager 140, in response to modifying the selection of form fields that are associated with the content folder, updates the metadata and data stored in the content folder to update the specific classification. Content folders are dynamic in that even after an end user has submitted a PDF form and content manager 140 has extracted data from that PDF form, an administrator can change/modify/add form fields associated with a given content folder and then content manager 140 reprocesses previously processed PDF forms. For example, when first creating a folder, content manager 140 might receive a selection of form fields "A" and "B," after which a number of users submit populated PDF forms. Subsequently, content manager 140 receives a modification so that the content folder is associated with fields "C" and "D" instead of "A" and "B." Content manager 140 would then automatically extract the data corresponding to the modification. Thus all of the processing would be executed again using the two new fields for the newly selected property fields. This processing can be applied to forms that were previously submitted.

In step 292, content manager 140, in response to modifying attributes of one or more form fields of the PDF file, updates the metadata and data stored in the content folder. In step 292, a PDF creator can make changes to XML elements or properties of form fields, such as field name, and then content manager 140 automatically updates the content folder to reflect changes to field attributes of a given PDF form.

In step 294, content manager 140 analyzes submitted PDF files received prior to the modification, and analyzes submitted PDF files received subsequent to the modification for automatically classifying submitted PDF files. Thus, modification to the content folder affects the classification of PDF forms previously processed as well as subsequently received PDF forms.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
    associating form fields of a Portable Document Format (PDF) file with a markup language schema, the markup language schema specifying semantic constraints on attributes of the form fields within the PDF file, the form fields for receiving data;
    creating a content folder representing a specific classification, the specific classification based on attributes of form fields from the PDF file;
    receiving a selection of a subset of the form fields from the PDF file;
    associating the selection of the subset of the form fields with the content folder including creating metadata describing the selected form fields, the content folder configured for storing corresponding individual data entries received within the selected form fields of PDF files;
    extracting data from form fields of submitted PDF files, the submitted PDF files having data input into form fields associated with the content folder, the extracted data and metadata describing the form fields stored separately from the submitted PDF files; and
    automatically classifying the submitted PDF files based on attributes of the selected form fields and the extracted data.

2. The computer-implemented method of claim 1, further comprising:
    applying a rule to data stored within the content folder, the rule identifying corresponding submitted PDF files satisfying the rule.

3. The computer-implemented method of claim 2, further comprising:
    in response to modifying the selection of form fields that are associated with the content folder, updating the metadata and data stored in the content folder to update the specific classification.

4. The computer-implemented method of claim 3, further comprising:
    in response to modifying attributes of one or more form fields of the PDF file, updating the metadata and data stored in the content folder.

5. The computer-implemented method of claim 4, wherein updating the metadata and data stored in the content folder includes analyzing submitted PDF files received prior to the modification, and analyzing submitted PDF files received subsequent to the modification for automatically classifying submitted PDF files.

6. The computer-implemented method of claim 2, further comprising:
storing the submitted PDF files in a content repository separate from the content folder, the data and metadata extracted and stored in the content folder being mapped to the submitted PDF files in the content repository.

7. The computer-implemented method of claim 6, wherein automatically classifying the submitted PDF files based on attributes of the selected form fields and the extracted data includes automatically classifying the submitted PDF files based on rules applied to data stored within the content folder.

8. The computer-implemented method of claim 2, wherein receiving a selection of a subset of the form fields from the PDF file includes selecting form fields from multiple different PDF files.

9. The computer-implemented method of claim 8, wherein receiving the selection of form fields includes:
receiving a selection of a form template; and
displaying a list of form fields for selection from the form template.

10. The computer-implemented method of claim 2, wherein creating the content folder representing the specific classification, the specific classification based on attributes of form fields from the PDF file, includes attributes of form fields from the PDF file specifying field names of form fields.

11. A computer program product including a computer-storage medium having instructions stored thereon for processing data information, such that the instructions, when carried out by a processing device, cause the processing device to perform the operations of:
associating form fields of a Portable Document Format (PDF) file with a markup language schema, the markup language schema specifying semantic constraints on attributes of the form fields within the PDF file, the form fields for receiving data via a graphical user interface;
creating a content folder representing a specific classification, the specific classification based on attributes of form fields from the PDF file;
receiving a selection of a subset of the form fields from the PDF file;
associating the selection of the subset of the form fields with the content folder including creating metadata describing the selected form fields, the content folder configured for storing corresponding individual data entries received within the selected form fields of PDF files;
extracting data from form fields of submitted PDF files, the submitted PDF files having data input into form fields associated with the content folder, the extracted data and metadata describing the form fields stored separately from the submitted PDF files; and
automatically classifying the submitted PDF files based on attributes of the selected form fields and the extracted data.

12. The computer program product of claim 11, further comprising:
applying a rule to data stored within the content folder, the rule identifying corresponding submitted PDF files satisfying the rule.

13. The computer program product of claim 12, further comprising:
in response to modifying the selection of form fields that are associated with the content folder, updating the metadata and data stored in the content folder to update the specific classification; and
wherein creating the content folder representing the specific classification, the specific classification based on attributes of form fields from the PDF file, includes attributes of form fields from the PDF file specifying field names of form fields.

14. The computer program product of claim 13, further comprising:
in response to modifying attributes of one or more form fields of the PDF file, updating the metadata and data stored in the content folder.

15. The computer program product of claim 14, wherein updating the metadata and data stored in the content folder includes analyzing submitted PDF files received prior to the modification, and analyzing submitted PDF files received subsequent to the modification for automatically classifying submitted PDF files.

16. The computer program product of claim 12, further comprising:
storing the submitted PDF files in a content repository separate from the content folder, the data and metadata extracted and stored in the content folder being mapped to the submitted PDF files in the content repository.

17. The computer program product of claim 16, wherein automatically classifying the submitted PDF files based on attributes of the selected form fields and the extracted data includes automatically classifying the submitted PDF files based on rules applied to data stored within the content folder.

18. The computer program product of claim 12, further comprising:
wherein receiving a selection of a subset of the form fields from the PDF file includes selecting form fields from multiple different PDF files; and
wherein receiving the selection of form fields includes:
receiving a selection of a form template; and
displaying a list of form fields for selection from the form template.

19. A computer system comprising:
a processor;
a memory coupled to the processor, the memory storing instructions that when executed by the processor cause the system to perform the operations of:
generating a Portable Document Format (PDF) file having form fields for receiving data via a graphical user interface;
associating the form fields with a markup language schema, the markup language schema specifying semantic constraints on attributes of the form fields within the PDF file;
creating a content folder representing a specific classification, the specific classification based on attributes of form fields from the PDF file;
receiving a selection of a subset of the form fields from the PDF file;
associating the selection of the subset of the form fields with the content folder including creating metadata describing the selected form fields, the content folder configured for storing corresponding individual data entries received within the selected form fields of PDF files;
extracting data from form fields of submitted PDF files, the submitted PDF files having data input into form fields associated with the content folder, the extracted data and metadata describing the form fields stored separately from the submitted PDF files; and
automatically classifying the submitted PDF files based on attributes of the selected form fields and the extracted data.

20. The computer system of claim 19, the memory storing further instructions that when executed by the processor causes the system to perform the operations of:
applying a rule to data stored within the content folder, the rule identifying corresponding submitted PDF files satisfying the rule.

* * * * *